ABSTRACT

United States Patent [19]
Schmitt

[11] 3,850,033
[45] Nov. 26, 1974

[54] GLUEABILITY TESTER
[75] Inventor: John A. Schmitt, Midland, Mich.
[73] Assignee: The Dow Chemical Company, Midland, Mich.
[22] Filed: July 23, 1973
[21] Appl. No.: 381,949

[52] U.S. Cl............................... 73/150 A, 73/88 B
[51] Int. Cl. ........................................... G01n 19/04
[58] Field of Search........... 73/150 A, 159, 88 B, 89

[56] References Cited
UNITED STATES PATENTS
3,396,578   8/1968   Skundberg........................ 73/150 A
3,412,606   11/1968  Cooper et al..................... 73/150 A
3,524,345   8/1970   Isaacson........................... 73/150 A Primary Examiner—S. Clement Swisher
Attorney, Agent, or Firm—Arthur J. Young

[57] ABSTRACT

An adherence testing device which applies a coating of adhesive or glue to a strip of web material, presses another strip of web material on the coated strip to form an adhered laminate, and subsequently separates the strip to measure the bond strength build-up as a function of time. The device automatically forms and separates the laminated strips, and records the resulting force necessary to separate the strips on a force/time recorder.

8 Claims, 4 Drawing Figures

PATENTED NOV 26 1974 3,850,033
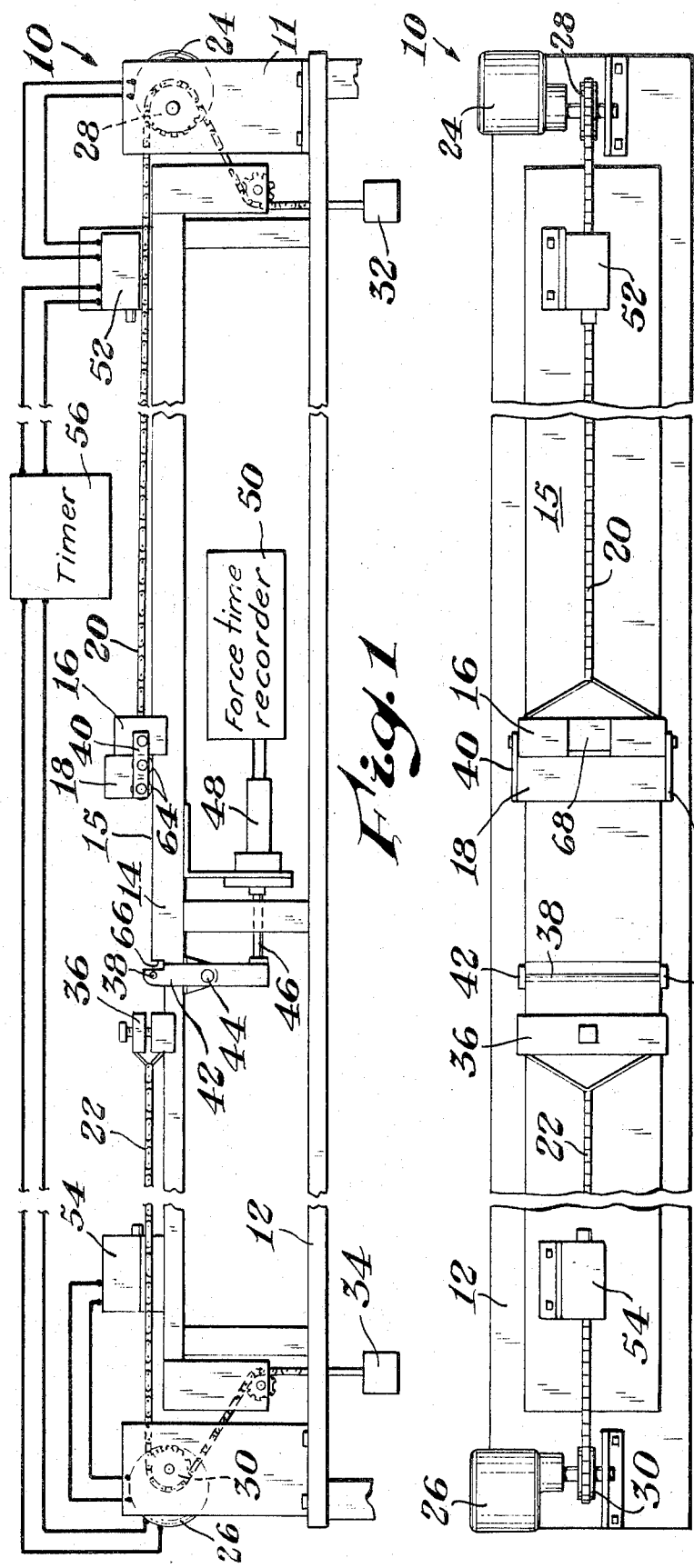
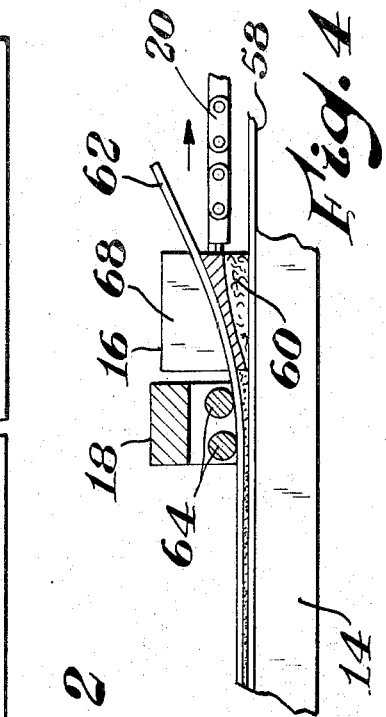
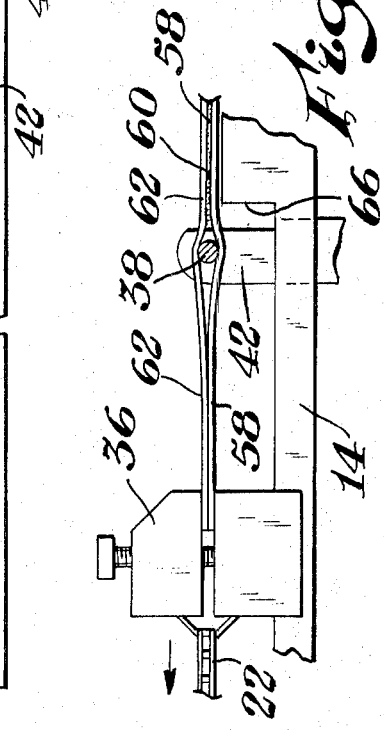

GLUEABILITY TESTER

BACKGROUND OF THE INVENTION

1. Field of the Invention

This invention relates to adherence testing apparatus, with particular reference to an automatic glueability testing device for testing the effectiveness of an adhesive or glue bond between two webs which have been laminated together.

2. Description of the Prior Art

There are many procedures and types of apparatus used to determine adhesion or bond strengths for laminated webs as, for example, those used by the paper industry or paper web converters. Paper web glueability tests range from the practical hand pull types to the use of completely automatic devices. However, there are two basic types. The first can be characterized by the time required to develop 100 percent fiber tear in one of the laminated paper webs. To achieve this end, a uniform glue layer is applied to one paper web surface and a second strip of paper web is applied to the glue layer and pressed with a roller or pressure plate. Then, from one end, usually at a 180 degree angle, the strips are separated at some function of time until fibers tear out completely from one surface across the glued area. Sometimes, the force to separate is recorded in conjunction with time. An example of this type of tester is illustrated in U.S. Pat. No. 3,396,578. The second test is characterized by the force or percent fiber tear obtained after a given time. Two strips or sheets are glued and held together under constant pressure for a measured time. They are then separated with or without a force measurement, at an angle usually of 0° or 180°, and the percent of the glued area showing fiber pull-out is recorded.

For many years the determination of the effectiveness of different adhesives on various types of web material has been somewhat of a hit or miss proposition. Although many methods and apparatus have been used to determine adhesive bond strengths of laminated webs, problems reoccur which are not understood and not easily resolved. The difficulty appears to lie in the enormous complexity of the variables influencing the test results. For example, variations in the paper webs, the binder and pigment or filler of the coating, the type of adhesive or glue used, adhesive application and end-use conditions, test methods, criteria for rating the bond and the like affect the measurement and make it difficult even to delineate glueability as a property. Some progress in improving glueability has been made by fixing as many conditions as practical, but correlation with production gluing operations is often poor.

There are, of course, many variations in the way adherence tests are accomplished. Each paper manufacturer and paper converter specifies the conditions which he believes will give the best correlation with field experience. However, general dissatisfaction with paper glueability testing methods and devices indicates that heretofore accurate reproducible testing has not been successfully achieved.

Examples of other types of adherence testing devices used for testing the adhesion of coatings to substrates, pressure sensitive adhesive and gummed tapes and the like are illustrated in U.S. Pat. Nos. 2,604,783; 2,752,780 and 2,831,346.

SUMMARY

In general, the present invention provides an adherence testing device which applies a coating of adhesive or glue to a strip of web material, presses another strip of web material on the coated strip to form an adhered laminate, and subsequently separates the strips to measure the bond strength build-up as a function of time. The device automatically forms and separates the laminated strips, and accurately and reproducibly records the resulting force needed to separate the strips as a function of time on a force/time recorder.

Accordingly, an object of the present invention is to provide a device for accurately measuring the effectiveness of an adhesive bond between laminated webs of material. Means are provided for applying a coating or layer of adhesive or glue to a first strip of web material, for laminating a second strip of web material to the coated surface of the first strip, for separating the first and second strips and for continuously measuring and recording the force needed to separate the first and second strips.

More specifically, the means for applying a coating of adhesive is preferably accomplished with an applicator bar which meters a constant layer thickness onto the first strip. The applicator bar is completely automated by mechanically linking it to a synchronous motor which draws the bar over the first strip at a constant speed. To avoid variations such as time, rate and pressure the means for laminating a second strip to the first strip is preferably accomplished using a weighted roller which is linked to the applicator bar such that it follows directly behind the same. To prevent sharp bending or creasing of the second strip and maintain accurate alignment of the same during lamination, a slot is provided in the applicator bar which serves as a guide for the second strip. At this point, means for providing a variable time delay such as an adjustable timer may be included in the testing device to achieve more time latitude in bond strength build-up in the laminate before the same is separated.

The means for separating the laminated strip is preferably accomplished by the interaction of a movable clamp traveling at a constant speed and a stationary separator bar or rod. The movable clamp is mechanically linked to a synchronous motor and clamps the ends of the first and second strip such that the laminated strips can be advanced by the separator bar. The separator bar is placed in a stationary position between the first and second strips aligned with the glue layer therebetween. The separator bar should be made as thin as practical in the direction perpendicular to the laminated strips in order to keep the separation angle between the strips as close to zero as possible. By maintaining the separation angle at a minimum, the separation force will correlate as closely as possible with actual field conditions as, for example, with the type of bond failure that will occur in a production box top gluing operation. A separation angle of 180° can be optionally achieved with the testing device by attaching only one strip in the movable clamp and the other strip to the separator bar. Also, frictional drag of the first and second strip over the separator bar can be minimized by applying a slip coating such as polytetrafluoroethylene on the bar.

The means for continuously measuring and recording the force needed to separate the first and second strips of the laminate is preferably accomplished by mechanically linking the separator bar to a strain gauge which in turn is electrically connected to a standard force/time recorder.

The starting and stopping of the synchronous motors and the variable delay timer is preferably accomplished with common limit switches.

BRIEF DESCRIPTION OF THE DRAWINGS

The objects and advantages of the present invention are even more apparent when taken in conjunction with the accompanying drawings in which like characters of reference designate corresponding materials and parts throughout the several views thereof, in which:

FIG. 1 is a partial side elevational view of a glueability testing device according to the principles of the present invention;

FIG. 2 is a partial plan view of the device shown in FIG. 1;

FIG. 3 is an enlarged fragmentary view illustrating the manner in which two strips of web material are glued together by the testing device; and FIG. 4 is an enlarged fragmentary view illustrating the manner in which the glued strips are separated.

DESCRIPTION OF THE PREFERRED EMBODIMENTS

The following description illustrates the manner in which the principles of the invention are applied but are not to be construed as limiting the scope of the invention.

More specifically referring to FIGS. 1 and 2, a glueability testing device 10 supported by a structural frame 12 is illustrated. The device 10 includes a plate 14 having a flat surface 15 for receiving a test specimen, an applicator bar 16 for applying glue, a weighted roller assembly 18, chains 20 and 22, synchronous motors 24 and 26, sprockets 28 and 30, weights 32 and 34, clamp 36, separator bar 38, connecting arms 40, lever arms 42, shaft 44, pin 46, strain gauge 48, force time recorder 50, limit switches 52 and 54 and variable delay timer 56. The weighted roller assembly 18 is connected to applicator bar 16 by connecting arms 40. Applicator bar 16 is mechanically linked to synchronous motor 24 by chain 20 and sprocket 28. Clamp 36 is mechanically linked to synchronous motor 26 by chain 22 and sprocket 30. Separator bar 38 is connected to lever arms 42 which pivot on shaft 44 so as to transfer a force through pin 46 to strain gauge 48 which in turn electrically transfers the force measured to force/time recorder 50. Limit switch 52 is electrically connected to motor 24 and timer 56 which in turn is electrically connected to motor 26. Limit switch 54 is electrically connected to motor 26.

Referring now to FIG. 4, the means for coating a first strip 58 of paperboard with adhesive 60 and then laminating a second strip 62 of paperboard to strip 58 is more clearly illustrated. The applicator bar 16 includes a slot 68 to avoid bending or creasing strip 62 and to guide the same as it is being laminated to strip 58. The weighted roller assembly 18 includes rubber rollers 64 to uniformly press strip 62 against strip 58 during lamination. It has been found that assembly 18 preferably applies at least 500 grams of weight to rollers 64 for each half inch width of strip 62 in order to insure reproducible test results. Also, motor 24 preferably advances applicator bar 16 and roller assembly 18 at a rate four inches per second so that a ten inch long laminated test specimen of strips 58 and 62 is formed in about two and a half seconds.

Referring to FIG. 3, the means for separating the laminated strips 58 and 62 is more clearly illustrated. Motor 26 preferably advances clamp 36 at a rate of about 10 inches per minute. This provides a convenient range between about 10 and about 55 seconds in a ten inch long specimen for fiber tear in either strip 58 or 62 as they separate around separator bar 38. Also shown is an offset shoulder 66 in plate 14. Shoulder 66 is provided so that the axis of separator bar 38 can be placed more in line with the glue layer 60 between strips 58 and 62 thereby minimizing the angle of separation between strips 58 and 62 as they pass over and under bar 38.

To operate glueability testing device 10, a strip 58 is first placed on surface 15 of plate 14 and a second strip 62 is placed in slot 68 and under rollers 64 of assembly 18. The ends of strips 58 and 62 are then secured in clamp 36. Thereafter, a quantity of adhesive 60 is placed on strip 58 in applicator bar 16 and motor 24 is turned on to advance bar 16 and assembly 18 thereby forming a laminated specimen of strips 58 and 62. When bar 16 reaches and activates limit switch 52, a motor 24 automatically stops and timer 56 starts counting off a preselected time delay interval. When the time interval is complete, motor 26 automatically starts and advances clamp 36 thereby causing strips 58 and 62 to separate as they pass over and under separator bar 38. Motor 26 is stopped when clamp 36 reaches and activates limit switch 54. The force generated by separation of strips 58 and 62 is mechanically transferred from separator bar 38 through lever arms 42 and pin 46 to strain gauge 48 which in turn electrically transfers the force measured to force/time recorder 50.

After making numerous tests with the above-described glueability tester, it has been found that accurate, reproducible, bond strength results can be achieved on paperboard materials. For most specimens, complete fiber tear times can be reproduced within about four seconds or less. The force curves obtained are not smooth because of inherent variations in the surfaces of paperboard, but generally can be reproduced closely up to the point where fiber tearing starts.

While certain representative embodiments and details have been shown for the purpose of illustrating the invention, it will be apparent to those skilled in the art that various changes and modifications can be made therein without departing from the spirit and scope of the invention.

What is claimed is:

1. A glueability tester useful for automatically determining the time required to build up bond strength of a glued laminate of a first and second strip of web materials and the force required to separate the glued laminate, comprising means for coating the first strip with a uniform coating of adhesive, means for joining the second strip to the adhesive coated first strip to form a laminate with a center adhesive layer, means for separating the laminated first and second strips, said means for separating including a separator bar positioned between the first and second strip with the bar in line with the adhesive layer whereby the angle during separation between the first and second strips is minimized and means for measuring and recording the force required to separate the laminated first and second strips.

2. The glueability tester of claim 1 wherein said means for coating the first strip includes an applicator bar, said bar having a slot for receiving the second strip whereby the second strip is guided onto the first strip without being bent or creased during lamination thereof.

3. The glueability tester of claim 1 wherein said means for joining the second strip to the first strip includes a weighted roller assembly adapted to apply a uniform pressure on the second strip as it is being joined to the first strip.

4. The glueability tester of claim 1 wherein said separator bar includes a slip coating on the outer surface thereof to minimize friction caused by the first and second strips passing over the bar during separation of the laminate.

5. The glueability tester of claim 4 wherein said slip coating is formed of polytetrafluoroethylene.

6. The glueability tester of claim 1 wherein said means for measuring and recording includes a strain gauge mechanically connected to the separator bar and electrically connected to a force/time recorder.

7. The glueability tester of claim 1 wherein said tester includes a variable timer adapted to introduce a time delay after the laminate has been formed and before the laminate is separated.

8. A method for measuring the bonding force of a glued laminate comprising:

a. forming a laminate of a first and second strip of web material with an adhesive layer therebetween;

b. separating the laminate by positioning a separator bar between the first and second strips and advancing the first and second strips so that they pass about each side of the separator bar; and c. measuring the force exerted on the separator bar as the first and second strips pass about each side of the separator bar.

* * * * *